(12) United States Patent
Yuan et al.

(10) Patent No.: US 7,730,727 B2
(45) Date of Patent: Jun. 8, 2010

(54) FLEXIBLE FLOW CONTROL DEVICE FOR COGENERATION DUCTING APPLICATIONS

(75) Inventors: Quan Yuan, Mt. Prospect, IL (US); Tailai Hu, Greenville, SC (US); Pavol Pranda, Lisle, IL (US)

(73) Assignee: American Air Liquide, Inc., Fremont, CA (US)

( * ) Notice: Subject to any disclaimer, the term of this patent is extended or adjusted under 35 U.S.C. 154(b) by 874 days.

(21) Appl. No.: 11/464,810

(22) Filed: Aug. 15, 2006

(65) Prior Publication Data
US 2007/0062175 A1      Mar. 22, 2007

Related U.S. Application Data

(60) Provisional application No. 60/714,383, filed on Sep. 6, 2005.

(51) Int. Cl.
*F02C 3/30*      (2006.01)
*F02C 6/00*      (2006.01)
(52) U.S. Cl. ..................... 60/775; 60/39.182
(58) Field of Classification Search ................. 60/39.5, 60/775, 39.182, 770
See application file for complete search history.

(56) References Cited

U.S. PATENT DOCUMENTS

| 4,007,587 | A | * | 2/1977 | Banthin et al. | ................. 60/204 |
| 5,461,853 | A | * | 10/1995 | Vetterick | ..................... 60/783 |
| 6,298,655 | B1 | * | 10/2001 | Lee et al. | ................. 60/39.182 |
| 2004/0255592 | A1 | * | 12/2004 | Braun | ......................... 60/772 |
| 2005/0120699 | A1 | * | 6/2005 | Han et al. | ..................... 60/39.5 |
| 2008/0016873 | A1 | * | 1/2008 | Harefors | ....................... 60/770 |

FOREIGN PATENT DOCUMENTS

| DE | 159446 | A1 | 3/1983 |
| DE | 19845763 | A1 | 12/1999 |
| EP | 1126135 | A2 | 8/2001 |
| JP | 07217448 | A | 8/1995 |

OTHER PUBLICATIONS

PCT Int'l Search Report, PCT/IB2006/002306.

* cited by examiner

*Primary Examiner*—Michael Cuff
*Assistant Examiner*—Gerald L Sung
(74) *Attorney, Agent, or Firm*—Christopher J. Cronin

(57) ABSTRACT

Apparatuses and methods for cogeneration ducting applications in which at least a desired effective flow stream control is maintained for stable combustion. A flow stream is directed through a flow control system to achieve the desired effective uniform flow rate and composition.

4 Claims, 7 Drawing Sheets

FLEXIBLE FLOW CONTROL DEVICE FOR COGENERATION DUCTING APPLICATIONS

CROSS-REFERENCE TO RELATED APPLICATIONS

This application claims the benefit under 35 U.S.C. §119(e) to provisional application No. 60/714,383, filed Sep. 6, 2005, the entire contents of which are incorporated herein by reference.

BACKGROUND

The power generation research and development community faces an important challenge in the years to come: to produce increased amounts of energy under the more and more stringent constraints of increased efficiency and reduced pollution. The increasing costs associated with fuel in recent years further emphasize this mandate.

Gas turbines offer significant advantages for power generation because they are compact, lightweight, reliable, and efficient. They are capable of rapid startup, follow transient loading well, and can be operated remotely or left unattended. Gas turbines have a long service life, long service intervals, and low maintenance costs. Cooling fluids are not usually required. These advantages result in the widespread selection of gas turbine engines for power generation. A basic gas turbine assembly includes a compressor to draw in and compress a working gas (usually air), a combustor where a fuel (i.e., methane, propane, or natural gas) is mixed with the compressed air and then the mixture is combusted to add energy thereto, and a turbine to extract mechanical power from the combustion products. The turbine is coupled to a generator for converting the mechanical power generated by the turbine to electricity.

A characteristic of gas-turbine engines is the incentive to operate at as high a turbine inlet temperature as prevailing technology will allow. This incentive comes from the direct benefit to both specific output power and cycle efficiency. Associated with the high inlet temperature is a high exhaust temperature which, if not utilized, represents waste heat dissipated to the atmosphere. Systems to capture this high-temperature waste heat are prevalent in industrial applications of the gas turbine.

Examples of such systems are cogeneration systems and combined cycle systems. In both systems, one or more heat exchangers are placed in the main exhaust duct of the turbine to transfer heat to feed-water circulating through the exchangers to transform the feed-water into steam. In the combined cycle system, the steam is used to produce additional power using a steam turbine. In the cogeneration system, the steam is transported and used as a source of energy for other applications (usually referred to as process steam).

A prior art cogeneration system typically includes a gas turbine engine, a generator, and a heat recovery steam generator. As discussed earlier, the gas turbine engine includes a compressor, a combustor (with a fuel supply), and a turbine. A compressor operates by transferring momentum to air via a high speed rotor. The pressure of the air is increased by the change in magnitude and radius of the velocity components of the air as it passes through the rotor. Thermodynamically speaking, the compressor transfers mechanical power supplied by rotating a shaft coupled to the rotor to the air by increasing the pressure and temperature of the air. A combustor operates by mixing fuel with the compressed air, igniting the fuel/air mixture and achieving a stabilized flame with burners with burners to add primarily heat energy thereto. A turbine operates in an essentially opposite manner relative to the compressor. The turbine expands the hot and pressurized combustion products through a bladed rotor coupled to a shaft, thereby extracting mechanical energy from the combustion products. The combusted products are exhausted into a duct. Feed-water is pumped through the steam generator located in the duct where it is evaporated into steam. It is through this process that useful energy is harvested from the turbine exhaust gas. The turbine exhaust gas is expelled into the atmosphere at a stack.

A uniform flow to the burners is important for a desired flame and a low emission level. Flow from the turbine usually possesses strong swirls and non-uniform velocities. Accordingly, elimination of the swirls and better distribution of the flow in the duct is needed. To this end, it is common in cogeneration plants to use flow distributors such as baffles and vanes in the duct. However, the shape of the flow distributors may not be optimized to regulate pressure drop which may be a detriment to the gas turbine's efficiency to maximize combustion and steam generation.

Due to deregulation of the energy market and volatility in energy prices, many cogeneration operators prefer to have the option of shutting down the turbine assembly while retaining the steam generation capability of the cogeneration system (known as fresh air mode operation). To enable operation of this fresh air mode, a furnace is disposed in the main exhaust duct. The furnace provides an alternate source of hot gas for steam generation. Fresh air is fed into the duct and then heated in the furnace as a substitute for gas turbine exhaust gas. In many practices, the fresh air is injected into the main exhaust duct through openings on the top, bottom or sides of the duct wall. Injection of fresh air through multiple openings creates flow stream variations. Thus, maintaining a uniform profile upstream of the furnace burners is problematic. Steam generation may be maximized by encouraging the fresh air flow to have a uniform profile prior to burner contact. Consequently, flow distributors are usually needed to direct the fresh air flow and a damper is usually needed to control the duct passage between the fresh air injection port and the gas turbine.

Therefore, there is a need for a flow control system to encourage uniform flow stream distribution that may be used with a cogeneration system. There is a further need for an apparatus and a method that may be used to increase steam generation efficiency by encouraging uniform flow stream distribution within the main exhaust duct of a cogeneration system.

SUMMARY

Embodiments of the present invention generally relate to a flow control apparatus for use with cogeneration ducting applications which aids in optimizing the shape of a flow stream for maximizing combustion. In one embodiment, a flow control apparatus is provided. The apparatus includes a contoured member forming a leading edge and defining a volume. The apparatus further includes a plurality of separation members disposed in the volume and defining a plurality of fluid passageways of varying length disposed axially along a length of the contoured member. The apparatus further includes a first plate actuatable between a first position and a second position and a second plate actuatable between a first position and a second position. While in their respective first positions, the upper and lower plates define a trailing edge, and while in their respective second positions, the upper and lower plates define an opening through which fluid flowing from the fluid passageways is expelled. The apparatus further includes an outer surface, formed by the contoured member and the first and second plates, that defines a fluid flow surface.

In another embodiment, a flow apparatus is provided. The apparatus includes a plurality of flow control members, each comprising a contoured member forming a leading edge, a first plate actuatable between a first position and a second position, and a second plate actuatable between a first position and a second position. While in their respective first positions, respective distal ends of the upper and lower plates are proximate to one another and define a trailing edge, and while in their respective second positions, the distal ends are separated from one another, whereby the upper and lower plates define an opening through which fluid flowing from the fluid passageways is expelled. The apparatus further includes an outer surface, formed by the contoured member and the first and second plates, that defines a fluid flow surface wherein a plurality of fluid channels of varying length are formed axially along a length of the contoured member and within a volume defined between the contoured member and the first and second plates. The apparatus further includes an actuator to actuate the plates between their respective first and second positions.

In another embodiment, a method for generating heat energy is provided. The method includes operating a cogeneration system in a first mode in which a gas turbine engine is operated to produce energy, and operating the cogeneration system in a second mode in which the gas turbine engine is disabled and the steam generation system operates to generate energy. The operation in the first mode includes the act of flowing an exhaust of the gas turbine engine over a plurality of flow control members located in a main exhaust duct of the cogeneration system. Each of the plurality of flow control devices is a wing-shaped member having a pair of plates disposed on opposite sides of the wing-shaped member. It will be appreciated that reference to a "wing-shaped" member describes a general shape of the flow control members and does not require the members to have an airfoil shape in which one surface has a longer linear length from a leading edge to a trailing edge relative to an opposite surface. An airfoil may be undesirable as a result of the lift produced. Each pair of plates is actuatable between a closed configuration and an open configuration in which the plates are rotated into a flow passageway defined by the main exhaust duct and form a flow outlet volume. The method further includes the act of configuring the flow control members actuated to the closed configuration while the cogeneration system operates in the first mode.

The operation of the cogeneration system in the second mode includes the acts of actuating the flow control-members to the open configuration and flowing air into an axially disposed fluid passageway formed in each respective flow control member, wherein the axially disposed fluid passageways are in fluid communication with the respective air outlet volumes whereby the air is expelled from the respective flow control members into the main exhaust duct.

In another embodiment, a flow control system for use with a cogeneration system is provided. The system includes a plurality of flow control members. Each flow control member comprises a contoured member forming a leading edge, a first plate actuatable between a first position and a second position, and a second plate actuatable between a first position and a second position. While in their respective first positions, respective distal ends of the upper and lower plates are proximate to one another and define a trailing edge. An outer surface is formed by the contoured member and the first and second plates in their respective first positions that defines a fluid flow surface to effect flow stream uniformity in exhaust gas operation mode. While in their respective second positions, the distal ends are separated from one another, whereby the upper and lower pates define an opening through which fluid flowing from the fluid passageways is expelled. An outer surface is formed by the contoured member and the first and second plates in their respective second positions that defines a fluid flow surface. A plurality of fluid channels of varying length are formed axially along a length of the contoured member and with a volume defined between the contoured member and the first and second plates to effect flow stream uniformity in fresh air mode. The system further includes an actuator to actuate the plates between their respective first and second positions.

In another embodiment, a system operable in a gas turbine mode and a fresh air mode is provided. The system includes a gas turbine engine coupled to a generator. The generator is configured to generate electrical energy from the mechanical energy provided by the gas turbine engine. The system further includes a heat recovery steam generator that is located downstream of the gas turbine engine. The heat recovery steam generator is in fluid communication with the gas turbine engine whereby the heat recovery steam generator receives exhaust from the gas turbine engine while operating in the gas turbine mode. The system further includes a plurality of wing-shaped flow control members disposed between the gas turbine engine and the heat recovery steam generator. Each flow control member comprises movable surfaces that are variably positionable to allow the respective flow control members to be placed in a first configuration during the gas turbine mode and a second configuration during the fresh air mode. During the second configuration of the fresh air mode, air is flowed into respective axial passageways of the flow control members and expelled into a volume defined between the respective movable surfaces.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
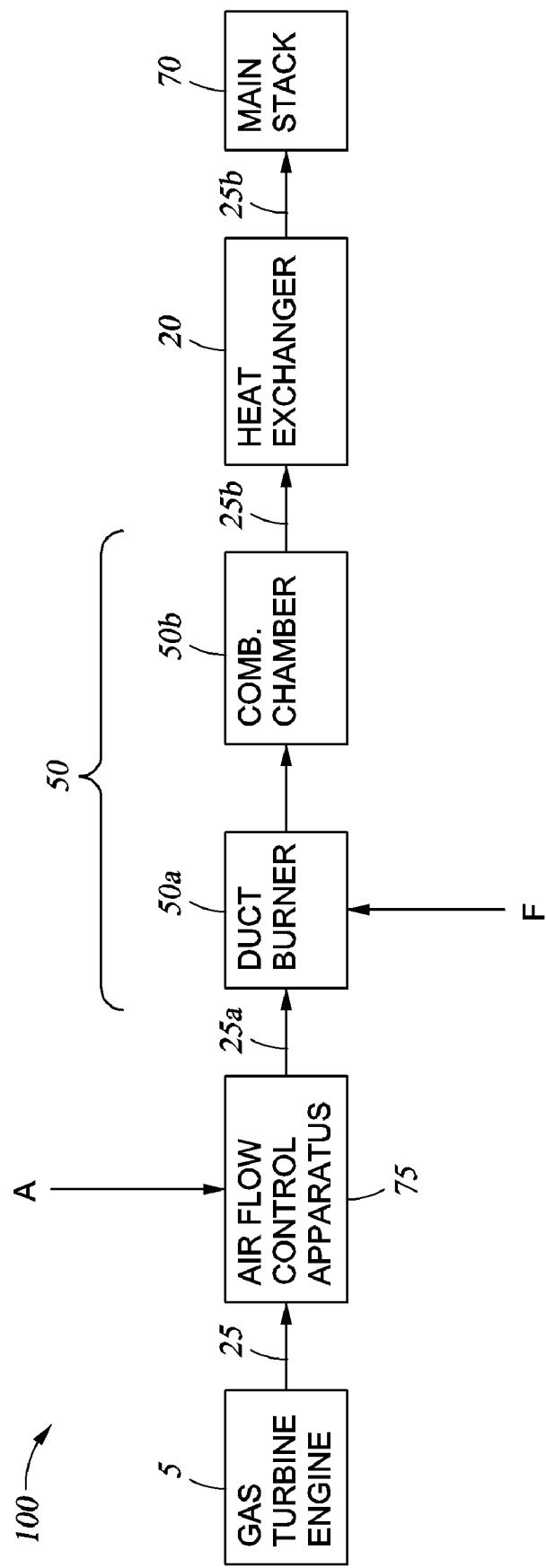
FIG. 1 is a process flow diagram of a cogeneration system, according to one embodiment of the present invention.

FIG. 1 is a process flow diagram of a cogeneration system 100, according to one embodiment of the present invention.

The cogeneration system 100 includes a gas turbine engine 5, a flow control system 75, a furnace 50, at least one heat exchanger 20, and a main stack 70. The furnace 50 and the heat exchanger 20 are typically referred to as a heat recovery steam generator. The cogeneration system 100 is operable in either cogeneration mode or fresh air mode. In cogeneration mode, the gas turbine engine 5 is operating, whereas, in fresh air mode, the gas turbine engine 5 is shut-down and the heat recovery steam generator is operated using an alternative fuel source. The furnace 50 includes a combustion chamber 50b and a duct burner 50a connected to a fuel supply F. The furnace 50 provides an alternate source of hot gas for steam generation in fresh air mode.

In one embodiment of operation, a stream 25 of exhaust gas is injected into the flow control system 75. The controlled flow stream 25a is injected, along with a stream of fuel F into the duct burner 50a. Combustion and mixing of the flow stream 25a, and the fuel stream F substantially occur in the combustion chamber 50b (some mixing and/or combustion may occur in the duct burner 50a). A second stream 25b of the exhaust gas results from the mixture and combustion of the controlled flow stream 25a. Heat energy is extracted from the second stream 25b of the exhaust gas in the heat exchanger 20 to produce steam. The second stream 25b of the exhaust gas may be released into the atmosphere at the main stack 70.

Figure 2:
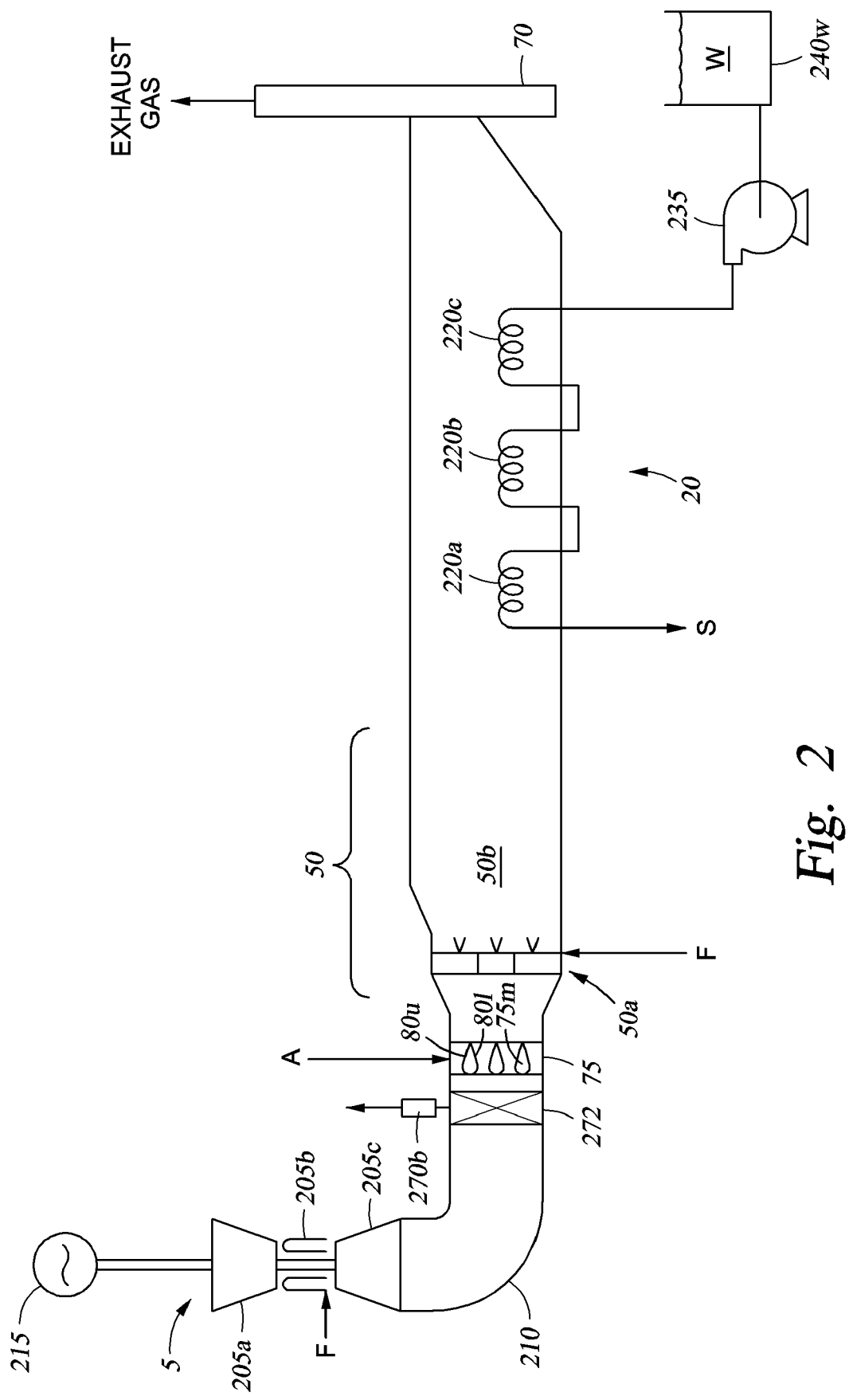
FIG. 2 is a schematic diagram of a cogeneration system, according to one embodiment of the present invention.

FIG. 2 is a schematic diagram of the cogeneration system 100, according to one embodiment of the present invention. The gas turbine engine 5 includes a compressor 205a, a combustor 205b (with a fuel supply F), and a turbine 205c. The gas turbine engine 5 is coupled to a generator 215. The combusted products from the gas turbine engine 5 are exhausted into a main exhaust duct 210.

Disposed in the main exhaust duct 210 is a flow control system 75. In the illustrative embodiment, the flow control system 75 comprises a plurality of flow control members 75m that are wing-shaped members having moveable plates 80u and 80l, disposed on opposite sides of the wing-shaped member. The plates are actuatable between a closed configuration (as shown) and an open configuration in which the plates are rotated into a flow pathway defined by the main exhaust duct 210 and form an air outlet volume.

Disposed in the main exhaust duct 210 are one or more heat exchangers 20. In the illustrative embodiment, the one or more heat exchangers 20 include a super-heater 220a, an evaporator 220b, and an economizer 220c. Since the super-heater 220a is disposed closest to the turbine 205c, it is exposed to the highest temperature combustion products, followed by the evaporator 220b and the economizer 220c.

Feed-water W is pumped through these exchangers 220a, b, c from feed-water tank 240w by feed-water circulation pump 235. The feed-water W first passes through the economizer 220c. At this point, the exhaust gas is usually below the saturation temperature of the feed-water W. The term saturation temperature designates the temperature at which a phase change occurs at a given pressure. The exhaust gas is cooled by the economizer 220c to lower temperature levels for greater heat recovery and thus efficiency. The heated feed-water W then passes through the evaporator 220b where it achieves saturation temperature and is at least substantially transformed into steam S. The steam S then proceeds through the super-heater 220a, where further heat energy is acquired by the steam to raise its temperature above saturation, thereby increasing the availability of useful energy therein. The superheated steam S is then transported for utilization in other processes, for example, refining crude oil, manufacturing chemicals, or generating electricity using a steam turbine. It is through this process that useful energy is harvested from the turbine exhaust gas. The turbine exhaust gas is expelled into the atmosphere at the main stack 70.

To enable operation of the fresh air mode, the furnace 50 is disposed in the main exhaust duct 210. A by-pass stack 270b and by-pass damper 272 are used for transition between cogeneration mode (also referred to hereinafter as gas turbine mode) and fresh air mode. The by-pass damper 272 also prevents air leakage into the gas turbine engine 5 during fresh air mode.

The plurality of flow control members 75m are actuated to the open configuration. The fresh air A is flowed into the axially disposed fluid passageway (not shown) in each respective flow control member 75m. The axially disposed fluid passageways (not shown) are in fluid communication with the respective air outlet volumes, whereby the air is expelled from the respective flow control members 75m into the main exhaust duct 210 furnace 50 (shown in FIG. 1, as including both the burner 50A and combustion chamber 50b). The fresh air A then travels through the main exhaust duct 210 to the duct burner 50a where the fuel stream F is injected and the fuel stream F is ignited into a fuel flame (not shown). Combustion and mixing of the fresh air A with the fuel stream F substantially occur in the combustion chamber 50b (some mixing and/or combustion may occur in the duct burner 50a).

The fuel F may be stored in a fuel tank (not shown) and carried to a header pipe (not shown) in the duct burner 50a by a fuel pipe (not shown). The fuel F is injected into the duct burner through nozzles (not shown). The fuel may be delivered to the fuel nozzles by a fuel pump (not shown) disposed along and in fluid communication with the fuel pipe.

Figure 3A:
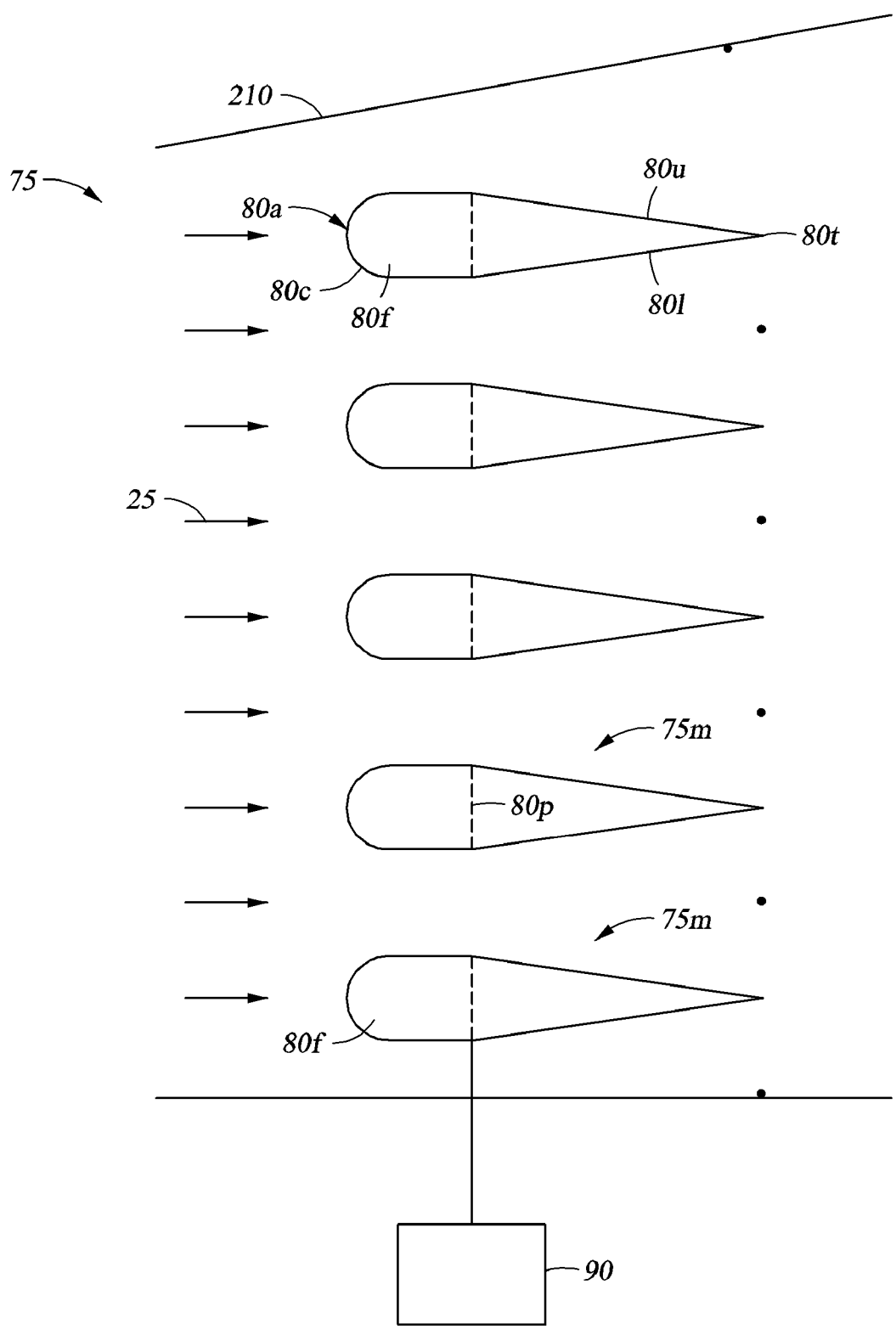
FIG. 3A is a simplified cross-sectional view of a gas turbine mode flow control apparatus, according to one embodiment of the present invention.

FIG. 3A is a simplified cross-sectional view of the flow control apparatus 75, according to one embodiment of the present invention. The cross-sectional view of the apparatus shows a plurality of flow control members 75m, within a main exhaust duct 210. Each of the flow control members 75m includes a contoured member 80c forming a leading edge 80a. The flow control member 75m further comprises an upper first plate 80u actuatable between a first position and a second position and a second lower plate 80l actuatable between a first position and a second position. While in their respective first positions, the upper first plate 80u and the lower second plate 80l define a trailing edge 80t wherein the outer surface formed by the contoured member 80c and the first upper plate 80u and the second lower plate 80l defines a fluid flow surface over which an exhaust of the gas turbine 25 flows. This fluid flow surface encourages uniformity in a flow stream through the main exhaust duct 210. A fluid passageway 80f is formed in a volume between an inner surface of the contoured member 80c and a perforated plate 80p. The perforated plate 80p is disposed between the fluid passageway 80f and the first upper plate 80u and the second lower plate 80l. An actuator 90 couples mechanical energy to the plates, 80u and 80l, in order to actuate the plates, 80u and 80l, between their respective first and second positions. In one embodiment, the actuator 90 is mechanically coupled to each flow control member 75m by an appropriate linkage. The particular linkage is not limiting of the present invention, and persons skilled in the art will recognize any variety of linkage arrangements within the scope of the present invention. It should be noted that, in one embodiment, each flow control member 75m is independently actuatable and that each upper plate 80u and each lower plate 80l are independently actuatable. For example, each flow control member 75m may have an associated servo for actuating the respective plates of the flow control member 75m. In a particular embodiment, the servos may be operated by a controller which may be connected the servos though a physical communications medium (cables) or through a wireless interface.

Although the flow control apparatus is described as shown, it should be appreciated that in this embodiment, the fluid passage way 80*f* and the perforated plate 80*p* are not necessary to define a fluid flow surface. It should be further appreciated that any geometry of the air flow control member 75*m* may be used that would define a fluid flow surface. It should be further appreciated that any orientation of the flow control member 75*m* may be used that would define a fluid flow surface.

Figure 4A:
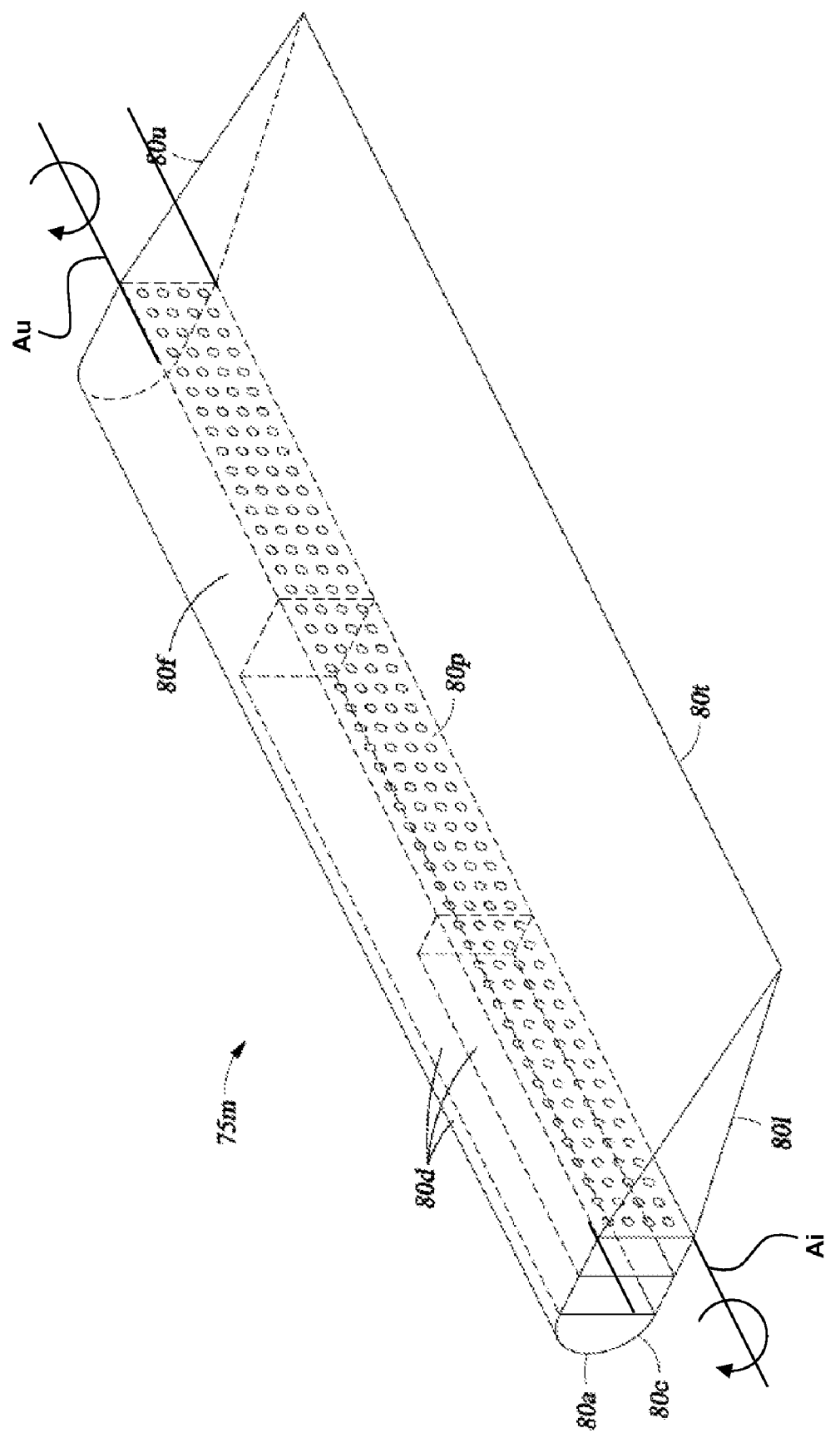
FIG. 4A illustrates a view of a portion of the gas turbine mode flow control apparatus, according to one embodiment of the present invention.
Figure 4B:
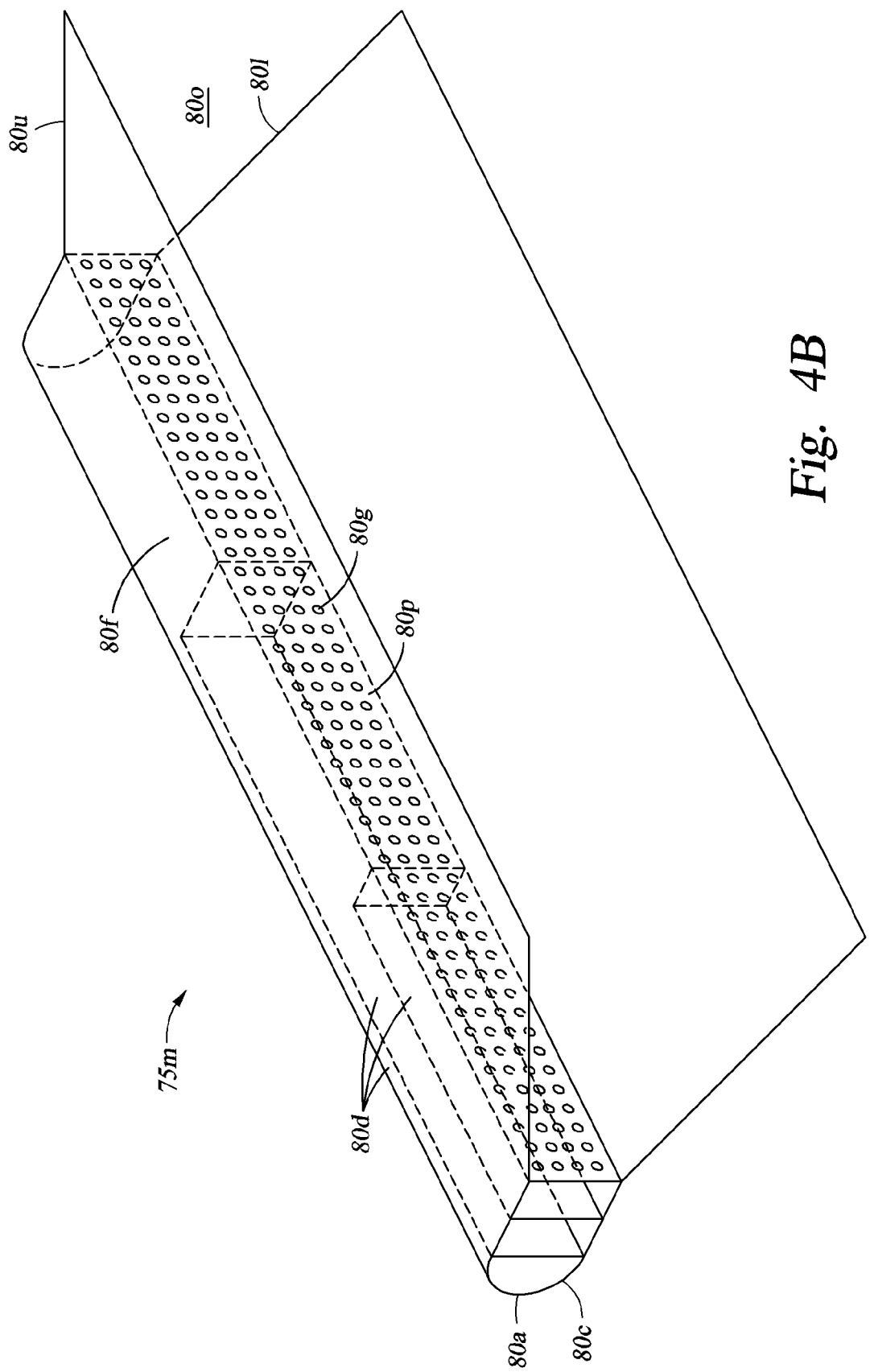
FIG. 4B illustrates a view of a portion of the fresh air mode flow control apparatus, according to one embodiment of the present invention.

FIGS. 4A-4B are perspective illustrations of one of the flow control members 75*m* in greater detail, according to one embodiment of the present invention. The profile of the flow control member 75*m* shown in FIG. 4A is a profile for use with the gas turbine mode of operation. Each of plates 80*u*, 80*i* are rotatably disposed on respective axes Au, Ai each of which is orthogonally disposed relative to the flow of the exhaust. The flow control member 75*m* is shown it its closed position. The fluid passageway 80*f* is disposed axially along a length of the contoured member 80*c*. The fluid passageway 80*f* may comprise a plurality of fluid channels 80*d* (i.e., sub-passageways formed in the fluid passageway 80*f*) of varying lengths that are formed axially along a length of the contoured member 80*c*. As illustrated, three fluid channels 80*d* are provided but a person skilled in the art will recognize that any number of fluid channels 80*d* may be provided to suit a specific operation. The cross section of the fluid channels 80*d* may vary in response to design considerations. For example, a wider fluid passageway 80*f* to flow an increased volume of fluid may require a corresponding variance in the width and length of the fluid channels to effect uniform flow output. A perforated plate 80*p* is disposed between the fluid passageway 80*f* and the upper first plate 80*u* and the lower second plate 80*l*. The perforated plate 80*p* includes a plurality of apertures 80*g* for affecting the velocities and pressures of the fluids flowing therethrough.

The profile of the flow control member 75*m* shown in FIG. 4B is a profile for use with the fresh air mode of operation. The flow control member 75*m* is shown in its open position. In the fresh air mode, fluid 85 is injected into the plurality of fluid channels 80*d* and expelled therefrom through the perforated plate 80*p* into the opening 80*o*. As illustrated, the perforated plate 80*p* provides the apertures 80*g* therein of a uniform size, but a person skilled in the art will recognize that the apertures 80*g* of the perforated plate 80*p* may be of varying design to minimize the velocity and pressure variations in the axial fluid flow through the fluid passageway 80*f* thereby encouraging uniform fluid output. For example, larger apertures 80*g* may comprise part of a perforated plate 80*p* that corresponds to the expulsion of fluid 85 from the fluid passageway 80*f* flowing at a higher velocity and pressure and smaller apertures 80*g* may comprise part of a perforated plate 80*p* that corresponds to the expulsion of fluid 85 from the fluid passageway 80*f* flowing at a lower velocity and pressure to encourage uniform fluid output into the opening 80*o*.

The operation of the flow control method will now be described with reference to FIGS. 3A, 3B, and 3C which illustrate simplified cross-sectional views of the flow control system 75 according to one embodiment of the present invention. As described above, FIG. 3A relates to the gas turbine mode of operation and shows the flow control method in a first configuration wherein the respective plates, 80*u* and 80*l*, of the flow control members 75*m* are closed. Exhaust gas 25 is expelled into the main exhaust duct 210 by the gas turbine engine 5 (See FIG. 2). The exhaust gas 25 flows over the flow control members 75*m* in their closed position thereby encouraging a uniform flow stream upstream of one or more heat exchangers 20 where heat is exchanged between the exhaust gas 25 and the feed water W thereby producing superheated steam S (See FIG. 2). The superheated steam S is then transported for utilization in other processes, for example, refining crude oil. The cooled exhaust gas is expelled into the atmosphere at the main stack 70 (See FIG. 2).

Figure 3B:
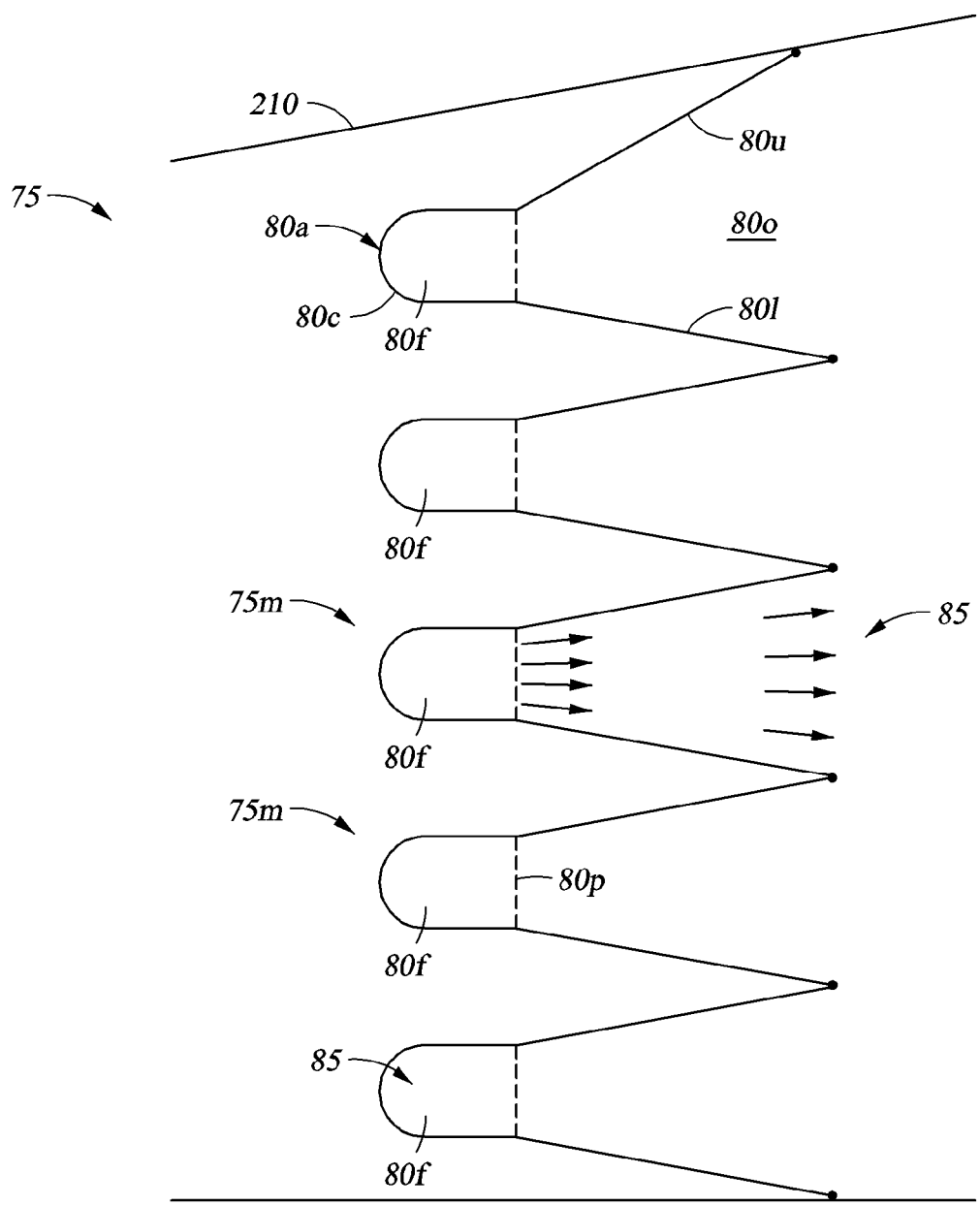
FIG. 3B is a simplified cross-sectional view of a fresh air mode flow control apparatus, according to one embodiment of the present invention.

FIG. 3B shows the flow control method in a fresh air mode of operation. During the fresh air mode of operation, the turbine assembly is shut down while the steam generation capability of the cogeneration system is retained. The fresh air mode of operation requires the introduction of fresh air A into the main exhaust duct 210 of the cogeneration system 100 upstream of the furnace 50 (See FIG. 2). FIG. 3B shows the flow control method in a second configuration wherein each of the respective plates, 80*u* and 80*l*, of the flow control member 75*m* are open, thereby creating an opening 80*o* within the main exhaust duct 210. Fresh air A is injected into the fluid passageway 80*f* and expelled through the perforated plate 80*p* into the opening 80*o*, after which the fresh air A flows downstream to the furnace 50 and then on to the heat exchangers 20 where superheated steam S is produced and utilized as explained in FIG. 3A. The cooled fresh air A is then expelled into the atmosphere at the main stack 70. Although the air flow control apparatus is described as shown, it should be appreciated that any geometry of the air flow control member 75*m* may be used that would define a fluid passageway 80*f*, a perforated plate 80*p*, or an opening 80*o*. It should be further appreciated that any orientation of the air flow control member 75*m* may be used that would define an opening 80*o*. For example, the upper first plate 80*u* and the second lower plate 80*l* may be actuated into a position half way between their respective first and second positions to define an opening.

Figure 3C:
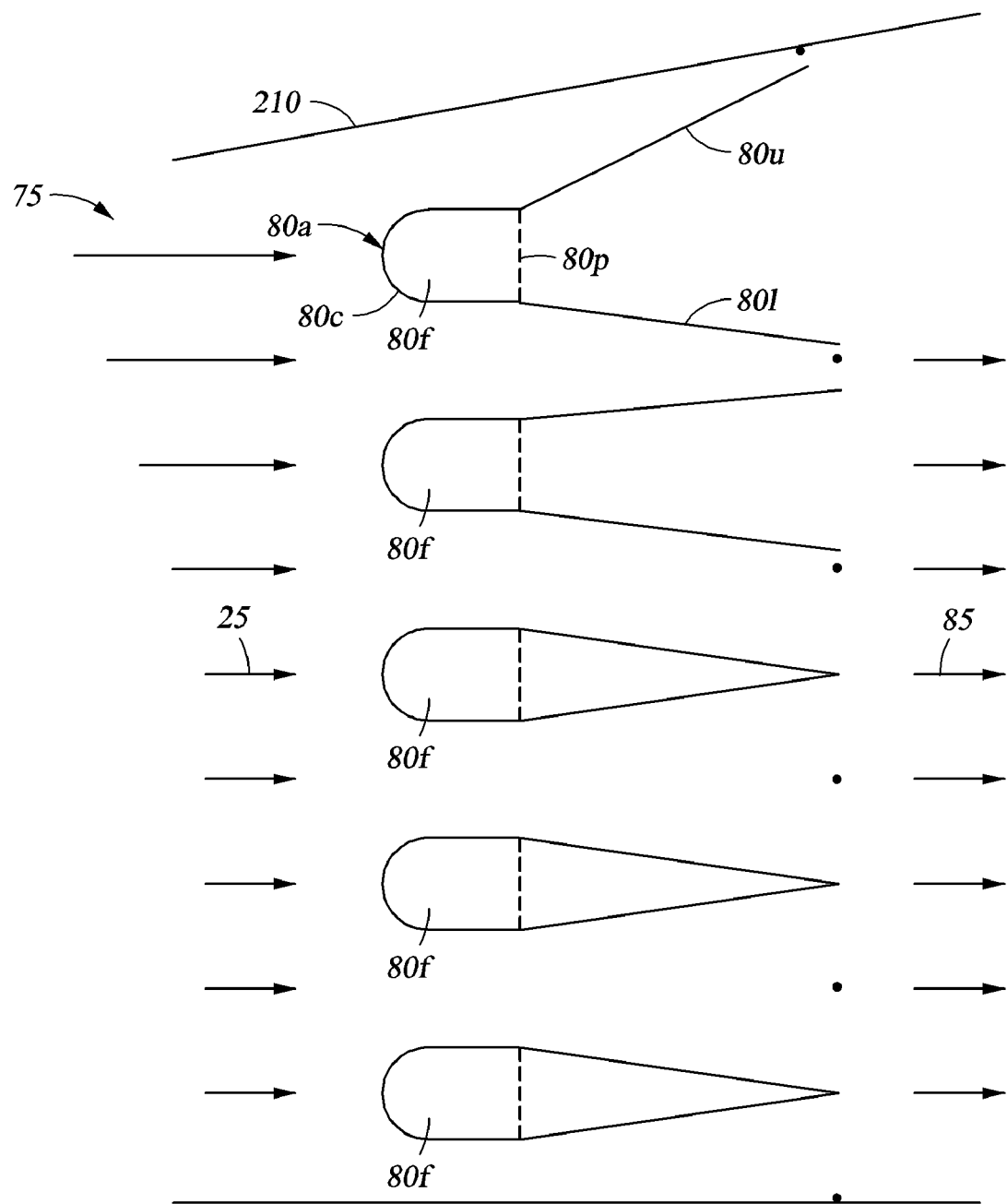
FIG. 3C is a simplified cross-sectional view of a gas turbine mode flow control apparatus, according to one embodiment of the present invention.

FIG. 3C shows another configuration of the flow control members (e.g., in the gas turbine mode of operation), according to one embodiment of the present invention. The inflow velocities from the gas turbine may vary significantly across the cross-section wherein larger velocities occur in the top portion of the main exhaust duct 210 than in the bottom portion. The flow control members 75*m* may be configured to adjust the flow at different heights and consequently ameliorate the flow distribution. The flow control members 75*m* at the top of the cross section are shown in an open position where the exhaust gas 25 velocities are largest. The flow control members 75*m* at the bottom of the cross section are shown in their closed position where the exhaust gas 25 velocities are smallest. From the top down in the cross-section, intermediate flow members 75*m* may be configured in a plurality of gradually smaller open positions until reaching a closed position. The fluid flow surface created by the open flow control members 75*m* operates to slow the stream of exhaust gas 25 at the top of the main exhaust duct 210 to the velocity of the stream of exhaust gas 25 at the bottom, thereby encouraging a uniform flow stream throughout the main exhaust duct 210. It is also contemplated that one or more vertically oriented flow control members could be placed upstream of the horizontally oriented flow control members to encourage uniform flow distribution.

Preferred processes and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention defined in the following claims.

What is claimed is:

1. A method for generating heat energy, comprising:
a) operating a cogeneration system in a first mode in which a gas turbine engine is operated to produce energy, wherein the operation in the first mode comprises:
  i) flowing an exhaust of the gas turbine engine over a plurality of flow control members located in a main exhaust duct of the cogeneration system; wherein each of the plurality of flow control members is a wing-shaped member having a pair of plates disposed on opposite sides of the wing-shaped member and actuatable between a closed configuration and an open configuration in which the plates are rotated into a flow pathway defined by the main exhaust duct and form an air outlet volume; wherein the flow control devices are in the closed configuration while the cogeneration system operates in the first mode; and
b) operating the cogeneration system in a second mode in which the gas turbine engine is disabled and a steam generation system operates to generate energy, wherein the operation in the second mode comprises:
  i) actuating the flow control members to the open configuration; and
  ii) flowing air into an axially disposed fluid passageway formed in each respective flow control member; wherein the axially disposed fluid passageways are in fluid communication with the respective air outlet volumes, whereby air is expelled from the respective flow control members into the main exhaust duct.

2. The method of claim 1, wherein respective distal ends of the plates are brought into proximity with one another to form a trailing edge of the respective flow control device while in the closed configuration.

3. The method of claim 1, wherein the axially disposed passageway is defined by a plurality of channels of differing lengths.

4. The method of claim 1, wherein the plates of each flow control device are rotatably disposed on respective axes each axis orthogonally disposed relative to the flow of the exhaust.

* * * * *